(12) United States Patent
Nasr et al.

(10) Patent No.: US 7,937,194 B2
(45) Date of Patent: May 3, 2011

(54) SYSTEM AND METHOD FOR REDUCING WHEEL SLIP AND WHEEL LOCKING IN AN ELECTRIC VEHICLE

(75) Inventors: Nader Nasr, Neenah, WI (US); Peter Werner, Mequon, WI (US)

(73) Assignee: Oshkosh Corporation, Oshkosh, WI (US)

( * ) Notice: Subject to any disclaimer, the term of this patent is extended or adjusted under 35 U.S.C. 154(b) by 1033 days.

(21) Appl. No.: 11/236,421

(22) Filed: Sep. 27, 2005

(65) Prior Publication Data
US 2006/0106521 A1 May 18, 2006

Related U.S. Application Data

(60) Provisional application No. 60/613,293, filed on Sep. 27, 2004.

(51) Int. Cl.
*B60T 8/68* (2006.01)
*B60T 8/175* (2006.01)

(52) U.S. Cl. ............... 701/22; 701/54; 701/65; 701/69; 701/70; 701/71; 701/74; 701/82; 701/83; 701/84; 303/139; 303/141; 303/144; 303/154; 303/155; 303/163; 303/166; 303/174; 303/175; 180/118; 180/197

(58) Field of Classification Search .................. None
See application file for complete search history.

(56) References Cited

U.S. PATENT DOCUMENTS

| | | | |
|---|---|---|---|
| 3,764,867 A | 10/1973 | Smith | |
| 5,081,365 A * | 1/1992 | Field et al. | 290/45 |
| 5,264,763 A | 11/1993 | Avitan | |
| 5,289,093 A | 2/1994 | Jobard | |
| 5,345,761 A * | 9/1994 | King et al. | 60/274 |
| 5,419,624 A | 5/1995 | Adler et al. | |
| 5,473,225 A | 12/1995 | Miyazaki | |

(Continued)

FOREIGN PATENT DOCUMENTS

DE 42 25 683 A1 2/1994

(Continued)

OTHER PUBLICATIONS

PCT International Search Report based on International Application No. PCT/US2005/034517, date of mailing of the International Search Report Feb. 21, 2006 (4 pages).

*Primary Examiner* — Jack Keith
*Assistant Examiner* — Jonathan M Dager
(74) *Attorney, Agent, or Firm* — Foley & Lardner LLP

(57) ABSTRACT

A method of reducing wheel slip and wheel locking in an electric traction vehicle includes receiving in a first controller a first signal value representative of a first amount of torque to be applied to at least one wheel of the electric traction vehicle by a motor coupled to the wheel and to the first controller, and a second signal value representative of a reference speed of the electric traction vehicle. The first and second signal values are generated by a second controller in communication with the first controller. The method also includes receiving in the first controller a third signal value representative of a speed of the at least one wheel, determining in the first controller a torque output signal using the first, second, and third signal values; and transmitting the torque output signal from the first controller to the motor.

34 Claims, 3 Drawing Sheets

U.S. PATENT DOCUMENTS

| | | | |
|---|---|---|---|
| 5,503,059 A * | 4/1996 | Pacholok | 89/1.11 |
| 5,521,788 A * | 5/1996 | Miyazaki | 361/42 |
| 5,539,641 A * | 7/1996 | Littlejohn | 701/70 |
| 5,615,933 A * | 4/1997 | Kidston et al. | 303/152 |
| 5,629,592 A * | 5/1997 | Henmi | 318/107 |
| 6,021,365 A * | 2/2000 | Ishii et al. | 701/22 |
| 6,028,403 A | 2/2000 | Fukatsu | |
| 6,038,500 A * | 3/2000 | Weiss | 701/22 |
| 6,122,588 A * | 9/2000 | Shehan et al. | 701/93 |
| 6,152,546 A * | 11/2000 | Daigle | 303/151 |
| 6,499,815 B1 | 12/2002 | Daigle | 303/151 |
| 6,543,565 B1 * | 4/2003 | Phillips et al. | 180/165 |
| 6,611,116 B2 | 8/2003 | Bachman et al. | |
| 6,636,787 B2 * | 10/2003 | Yamaguchi et al. | 701/22 |
| 6,687,593 B1 * | 2/2004 | Crombez et al. | 701/71 |
| 6,691,013 B1 * | 2/2004 | Brown | 701/70 |
| 6,719,379 B2 * | 4/2004 | Crombrez | 303/152 |
| 7,117,964 B1 * | 10/2006 | Kuang et al. | 180/65.22 |
| 2002/0005304 A1 | 1/2002 | Bachman et al. | |
| 2002/0103580 A1 * | 8/2002 | Yakes et al. | 701/22 |
| 2003/0158635 A1 | 8/2003 | Pillar et al. | |
| 2003/0158638 A1 | 8/2003 | Yakes et al. | |
| 2003/0158640 A1 | 8/2003 | Pillar et al. | |
| 2003/0225501 A1 * | 12/2003 | De La Salle et al. | 701/93 |
| 2003/0230443 A1 | 12/2003 | Cramer et al. | |
| 2004/0002794 A1 | 1/2004 | Pillar et al. | |
| 2004/0024502 A1 | 2/2004 | Squires et al. | |
| 2004/0040757 A1 * | 3/2004 | Scherg et al. | 180/65.2 |
| 2004/0207348 A1 * | 10/2004 | Wilton et al. | 318/139 |
| 2004/0245947 A1 * | 12/2004 | Wilton et al. | 318/139 |
| 2004/0249525 A1 * | 12/2004 | Okoshi et al. | 701/22 |
| 2004/0254711 A1 * | 12/2004 | Zumberge et al. | 701/76 |
| 2005/0060076 A1 * | 3/2005 | Phillips et al. | 701/51 |
| 2005/0119806 A1 * | 6/2005 | Nasr et al. | 701/22 |
| 2005/0211489 A1 * | 9/2005 | Kowatari et al. | 180/243 |
| 2006/0237250 A1 * | 10/2006 | Kowatari et al. | 180/242 |
| 2006/0243502 A1 * | 11/2006 | Weber et al. | 180/65.3 |
| 2008/0087484 A1 * | 4/2008 | Fenelli et al. | 180/236 |

FOREIGN PATENT DOCUMENTS

| | | |
|---|---|---|
| DE | 43 08 903 A1 | 9/1994 |

* cited by examiner

SYSTEM AND METHOD FOR REDUCING WHEEL SLIP AND WHEEL LOCKING IN AN ELECTRIC VEHICLE

CROSS-REFERENCE TO RELATED PATENT APPLICATIONS

This application claims the benefit of U.S. Provisional Application No. 60/613,293, filed on Sep. 27, 2004 and entitled "System and Method for Reducing Wheel Slip and Wheel Locking in an Electric Vehicle," the entire content of which is hereby incorporated by reference.

FIELD

The present invention relates generally to the field of electric vehicles and more specifically to systems and methods for reducing wheel slip and wheel locking in electric vehicles.

BACKGROUND

An electric traction vehicle is a vehicle that uses electricity in some form or another to provide all or part of the propulsion of the vehicle. This electricity can come from a variety of sources, such as stored energy devices relying on chemical conversions (batteries) to create electrical energy, stored energy devices relying on stored electrical charge (capacitors), stored energy devices relying on mechanical stored energy (e.g., flywheels, pressure accumulators), and energy conversion products. In a typical conventional electric traction vehicle, a prime mover, such as a diesel engine, is used to drive an electric generator or alternator which supplies electric current to one or more traction motors. The traction motors typically are coupled to wheel sets on the vehicle. A typical vehicle that utilizes this type of electric traction is a railroad locomotive. In some conventional electric traction vehicles, stored energy is used to provide the main power which provides the electrical current to one or a plurality of traction motors. A typical vehicle that utilizes this type of electric traction is a golf cart or battery powered electric car. In some conventional electric traction vehicles, having more than one source of energy is desirable, such as a stored energy unit and an internal combustion engine coupled to a generator. By having more than one source of energy, some optimizations in the design can allow for more efficient power production, thus allowing power to be used from different sources to come up with a more efficient system for traction. These types of vehicles are commonly referred to as hybrid electric vehicles (HEV). Series and Parallel HEV system designs are what is usually encountered.

In a typical electric traction system of an electric traction vehicle, an electronic vehicle controller may be used to control the torque output of the electric traction motors. The vehicle controller may also be configured to reduce or prevent wheel slip or wheel locking. Wheel slip occurs during motoring when the amount of torque output from the motor produces a force greater than can be applied to a surface in contact with a wheel coupled to the motor, causing an increase in the speed of the wheel with respect to the speed of the electric traction vehicle. Wheel locking occurs during regenerative braking when the amount of torque output from the motor produces a force greater than can be applied to a surface in contact with a wheel coupled to the motor, causing a decrease in the speed of the wheel with respect to the speed of the electric traction vehicle. In a typical electric traction system of an electric traction vehicle, an electronic vehicle controller may attempt to prevent wheel spin or wheel locking by monitoring the speed of each wheel coupled to each motor, and to adjust the torque reference value for a particular motor using the speed of the wheel coupled to the motor so that the amount of torque output from the motor does not produce a force greater than can be applied a surface in contact with the wheel coupled to the motor.

Processing wheel speed feedback signals in the vehicle controller increases the overall amount of processing required in the vehicle controller, and can lead to time delays associated with transmitting and processing the various wheel speed feedback signals and the torque reference value. If significant delays occur during the process of obtaining the feedback signals, processing a change in the torque reference value, and transmitting the adjusted torque reference value, the vehicle may become unstable. Thus there is need for a system and method for reducing wheel slip and wheel locking in an electric vehicle which uses a motor drive controller rather than the vehicle controller to reduce wheel slip and wheel locking, and which controls wheel slip and wheel locking without adjusting the torque reference provided by the vehicle controller.

SUMMARY

According to an exemplary embodiment, a method of reducing wheel slip and wheel locking in an electric traction vehicle includes receiving in a first controller a first signal value representative of a first amount of torque to be applied to at least one wheel of the electric traction vehicle by a motor coupled to the wheel and to the first controller, and a second signal value representative of a reference speed of the electric traction vehicle. The first and second signal values are generated by a second controller in communication with the first controller. The method also includes receiving in the first controller a third signal value representative of a speed of the at least one wheel, determining in the first controller a torque output signal using the first, second, and third signal values; and transmitting the torque output signal from the first controller to the motor.

According to another exemplary embodiment, a method of reducing wheel slip and wheel locking in an electric traction vehicle includes configuring a vehicle system controller to determine a first torque value and a reference speed value, configuring a motor drive controller coupled to an electric motor and in communication with the vehicle system controller to determine a second torque value using the reference speed and a speed of at least one wheel coupled to the electric motor, and configuring the motor drive controller to transmit a torque output signal representative of one of the first torque value and the second torque value so that the reference speed value provides a limit for the speed of the at least one wheel.

According to another exemplary embodiment, an electric traction system for use with an electric vehicle includes a vehicle controller configured to determine a first torque value and a reference speed value, and a motor drive controller coupled to an electric motor and in communication with the vehicle system controller. The motor drive controller is configured to determine a second torque value using the reference speed value and a speed of at least one wheel coupled to the electric motor, and to transmit a torque output signal representative of one of the first torque value and the second torque value so that the reference speed value provides a limit for the speed of the at least one wheel.

Other features and advantages of the present invention will become apparent from the following detailed description and accompanying drawings. It should be understood, however, that the detailed description and specific examples are given by way of illustration and not limitation. Many modifications and changes within the scope of the present invention may be made without departing from the spirit thereof, and the invention includes all such modifications.

BRIEF DESCRIPTION OF THE DRAWINGS

The exemplary embodiments will hereafter be described with reference to the accompanying drawings, wherein like numerals depict like elements, and.

DETAILED DESCRIPTION

Figure 1:
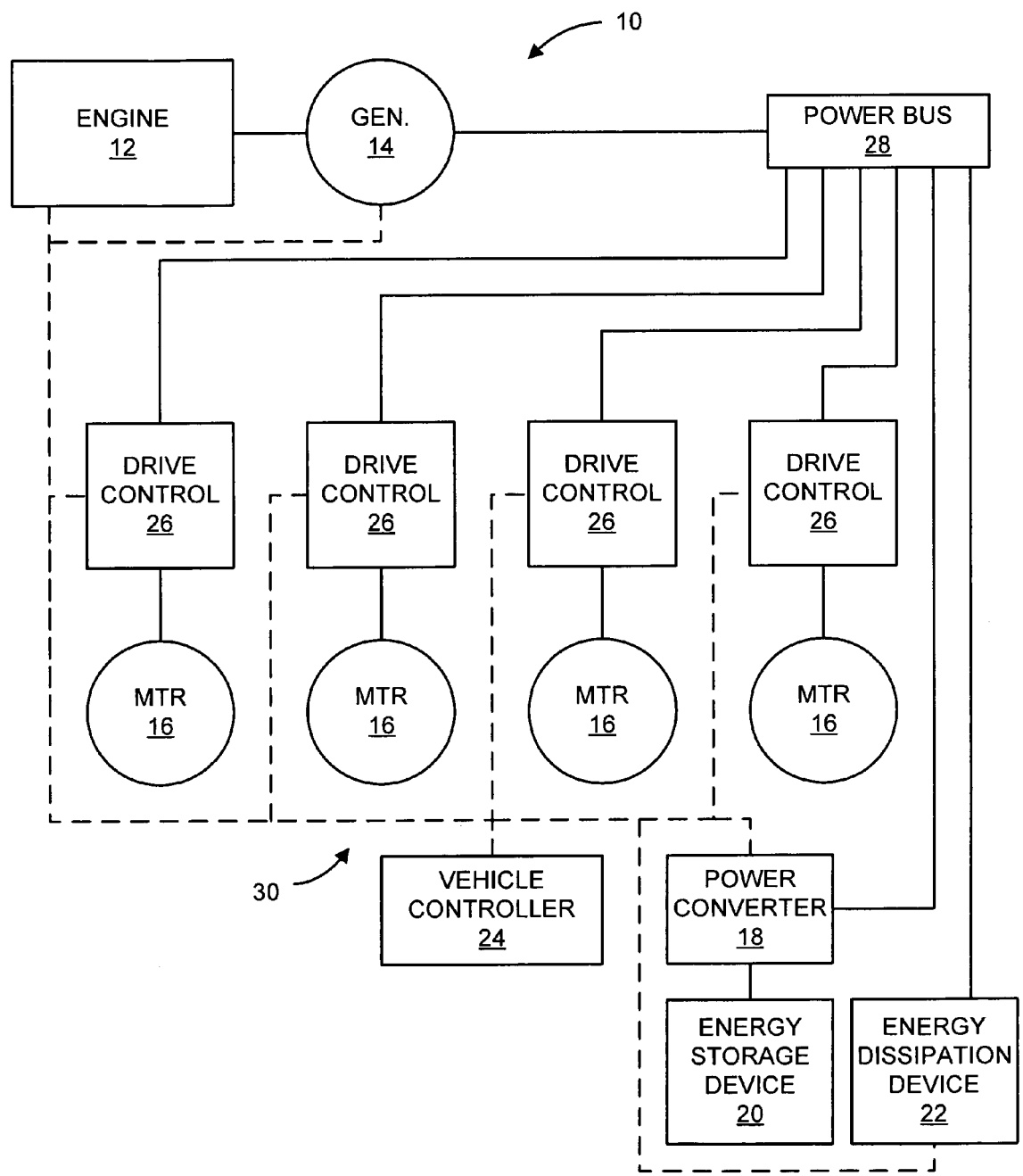
FIG. 1 is a schematic diagram of an electric traction vehicle according to an exemplary embodiment.

Before turning to the FIGURES which illustrate the exemplary embodiments in detail, it should be understood that the invention is not limited to the details or methodology set forth in the following description or illustrated in the FIGURES. The invention is capable of other embodiments or being practiced or carried out in various ways. It should also be understood that the phraseology and terminology employed herein is for the purpose of description only and should not be regarded as limiting.

In general, the system and method for reducing wheel slip and wheel locking in an electric vehicle may be used with an electric vehicle configured to operate in both a "motoring" mode and a "regeneration" mode. "Motoring" generally refers to the forward or backward propulsion of the electric traction vehicle by operating one or more electric motors as motors to propel the vehicle. "Regeneration" generally refers to the use of the electric motors to slow or retard the electric traction vehicle by operating each of the electric motors as a generator to receive mechanical energy from the rotation of the wheels coupled to each motor in order to generate electrical energy.

The system and method for reducing wheel slip and wheel locking in an electric vehicle utilizes a motor drive controller coupled to an electric motor to receive a torque reference and a speed reference from a vehicle controller. If the electric traction vehicle is operating in the motoring mode, the vehicle controller sends a speed reference that is greater than the actual speed of the electric traction vehicle, and if the electric traction vehicle is operating in the regeneration mode, the vehicle controller sends a speed reference that is less than the actual speed of the electric traction vehicle. The motor drive controller also receives a wheel speed feedback signal for a wheel coupled to the motor.

The motor drive controller uses the speed reference and the wheel speed feedback signal to determine a second torque reference and selects either the torque reference from the vehicle controller or the second torque reference as a torque output signal to the motor. If the wheel speed feedback signal increases above the speed reference when the electric traction vehicle is operating in motoring mode (i.e., the wheel begins to slip) or if the wheel speed feedback signal decreases below the speed reference when the vehicle is in regeneration mode (i.e., the wheel begins to lock), the motor drive controller uses the second torque reference to limit the speed of the wheel to the speed reference. Otherwise, the motor drive controller uses the torque reference from the vehicle controller. In this way, the motor drive controller, rather than the vehicle controller, performs the necessary processing to control wheel slip and wheel locking, so that the vehicle controller is not required to adjust the torque reference. Using the motor drive controller rather than the vehicle controller to receive the wheel speed feedback and control wheel slip and wheel locking may reduce time delays associated with transmitting and processing the wheel speed feedback, increase stability, and improve traction in the electric traction vehicle.

FIG. 1 is a schematic diagram of an electric traction vehicle 10 according to an exemplary embodiment. An electric traction vehicle is a vehicle that uses electricity in some form or another to provide all or part of the propulsion power of the vehicle. This electricity can come from a variety of sources, such as stored energy devices relying on chemical conversions (batteries), stored electrical charge devices (capacitors), stored energy devices relying on mechanical stored energy (e.g. flywheels, pressure accumulators), and energy conversion products. A hybrid electric vehicle is an electric traction vehicle that uses more than one sources of energy, such as one of the electrical energy storage devices mentioned above and another source, such as an internal combustion engine. By having more than one source of energy some optimizations in the design can allow for more efficient power production, thus one can use power from different sources to come up with a more efficient system for traction. The electric traction vehicle 10 can be used to implement electric vehicles in general and/or hybrid electric vehicles in particular. The electric traction vehicle 10 can implement a number of different vehicle types, such as a fire-fighting vehicle, military vehicle, snow blower vehicle, refuse handling vehicle, concrete mixing vehicle, etc.

In the illustrated embodiment, the electric traction vehicle 10 includes an engine 12, a generator 14, a plurality of electric motors 16, an electric power converter 18, an energy storage device 20, an energy dissipation device 22, a vehicle controller 24, and a plurality of motor drive controllers 26. The generator 14, power converter 18, the energy dissipation device 22, and the motor drive controllers 26 are interconnected by a power bus 28, such as an AC or DC power bus. An exemplary electric traction vehicle utilizing an exemplary AC power bus is described in U.S. Pat. No. 6,757,597, the entire contents of which are hereby incorporated by reference. Electric traction vehicle 10 is generally configured to reduce wheel slip and wheel locking.

The engine 12 is preferably an internal combustion engine, such as a diesel engine configured to provide mechanical power to the generator 14. The generator 14 is coupled to the engine 12 and is configured to provide AC or DC power to power bus 28. According to an exemplary embodiment, the generator 14 is a synchronous generator producing 460 to 480 volts, three phase, AC 60 hertz power for the electric traction vehicle 10. However, it is contemplated that different sized generators or alternators can be coupled to the prime mover for purposes of generating either higher or lower electrical power. For instance, a single phase system can be utilized, or a system that generates 720 volts can be used, or a system that operates at a frequency other than 60 hertz, such as 50 hertz, which is typical in European countries.

The electric motors 16 are appropriately sized electric traction motors, which may be AC or DC electric motors. According to an exemplary embodiment, the electric motors are AC, three phase induction electric motors. Preferably, the electric motors 16 have a simple cast rotor, machine mount stator, sealed ball bearings, and no brushes, internal switches or sliding contact devices, such that the rotor as the only moving part of each electric motor 16. The electric motors 16 are configured to receive electrical power from the power bus 28 through the motor drive controllers 26 in order to provide a mechanical energy output to a wheel or axle. The electric motors 16 are also configured to receive mechanical energy from the wheel or axle during regenerative braking in order to generate electrical power onto the power bus 28.

The electric power converter 18 is coupled to the energy storage device 20 and is configured to convert the electrical power generated by the generator 14, or by the electric motors 16 during regenerative braking, to the energy mode required by the energy storage device 20. For example, according to an exemplary embodiment, the electric power converter is configured to convert AC power generated by the generator 14 to DC power and transfer such converted power to the storage device 20. The electric power converter 18 may also convert the energy stored in the energy storage device 20 back to the energy mode of generator 14 to augment and supplement the power generated by generator 14 over the power bus 28. The energy storage device 20 may be electric capacitors, electrochemical capacitors or "ultracapacitors," storage batteries, a flywheel, or hydraulic accumulators.

The energy dissipation device is typically a resistive element through which electrical power generated by the electric motors 16 during regenerative braking is dissipated as heat if the electrical power exceeds the capacity of the energy storage device 20. An example of an energy dissipation device 22 is a resistive coil that may be additionally cooled by fans or an appropriate fluid. Another example of an energy dissipation device 22 is a steam generator which utilizes excess heat generated in the vehicle to heat water to produce steam.

The vehicle controller 24 is communicatively coupled to the engine 12, the generator 14, the electric power converter 18, the energy dissipation device 22, and the motor drive controllers 26 using an interconnection such as a data bus network 30. The vehicle controller 34 is generally configured to control the operation of the engine 12, the generator 14, the plurality of electric motors 16, the electric power converter 18, the energy storage device 20, the energy dissipation device 22, and the plurality of motor drive controllers 26. More specifically, the vehicle controller 24 is configured to provide a speed reference and a torque reference to each of the plurality of motor drive controllers 26. The vehicle controller 24 receives data input from concerning the speed and power required for operation of electric traction vehicle 10. The torque output of the each electric motor 16 is adjusted based on the rotational speed and power requirements established by the vehicle controller 24 and transmitted to each motor drive controller 26 over the data bus network 30.

The motor drive controllers 26 are in communication with the vehicle controller 24 and are coupled to each electric motor 16. According to an exemplary embodiment, the drive controller is an inverter, such as an AC-to-AC inverter having built-in motor control functionality. Each motor drive controller 26 is generally configured to control the operation of each respective electric motor 16. For example, he motor drive controllers 26 are configured to provide a torque output signal to the electric motors 16 based on the torque reference provided by the vehicle controller 24 such that electric traction vehicle 10 may operate in either a "motoring" mode or a "regeneration" mode. In the "motoring" mode, the drive controllers 26 provide a positive torque output signal to each respective electric motor 16 such that each electric motor 16 receives electrical power from the power bus 28 through the motor drive controller in order to provide a mechanical torque output to a wheel or axle. In the regeneration mode, the drive controllers 26 provide a negative torque output signal to each respective electric motor 16 such that each electric motor 16 receives or to receive mechanical energy from the wheel or axle during regenerative braking in order to generate electrical power onto the power bus 28.

The motor drive controllers 26 are also configured to control the torque output of each respective electric motor 16 in order to reduce or eliminate wheel slip and wheel locking in the electric traction vehicle 10. The motor drive controllers 26 control the torque output of each of the electric motors 16 based on the torque reference and the speed reference provided by the vehicle controller 24 such that the vehicle controller is not required to adjust the torque reference to control wheel slip or wheel locking.

Figure 2:
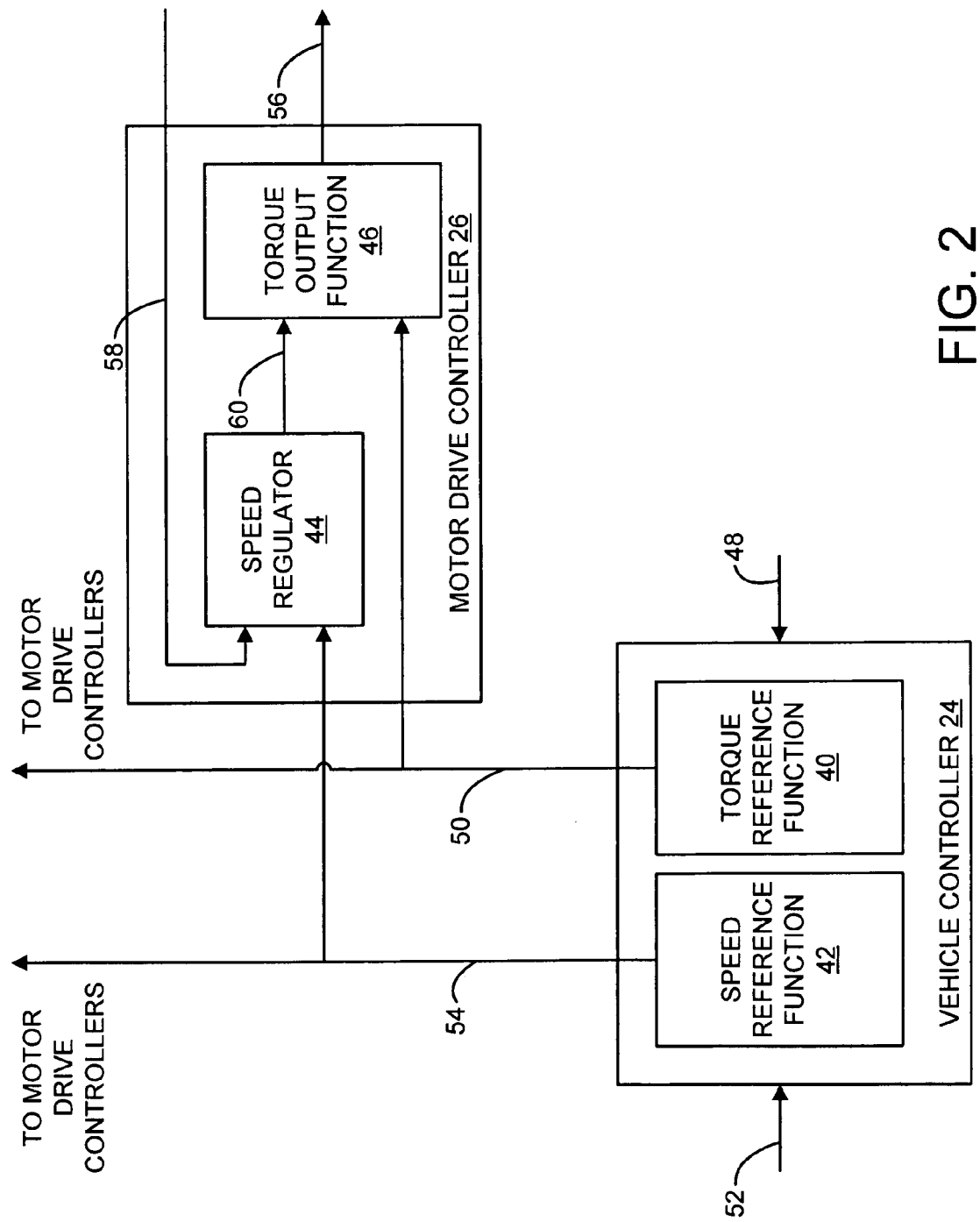
FIG. 2 is a schematic diagram illustrating the vehicle controller and a motor drive controller of FIG. 1 according to an exemplary embodiment.

FIG. 2 schematically illustrates the vehicle controller 24 and a motor drive controller 26 shown in FIG. 1 according to an exemplary embodiment. In the illustrated embodiment, the vehicle controller 24 includes a torque reference function 40 and a speed reference function 42. The torque reference function 40 is configured to receive an operator input, such as an accelerator position signal 48, and to determine a torque reference value. The torque reference function 40 includes a power limit function and/or a torque ramp function, as well as other functions which define operational constraints on the torque reference value. The torque reference function 40 processes the accelerator position and various other inputs, and outputs a torque reference signal 50 containing the torque reference value.

According to an exemplary embodiment, the torque reference function generates a positive torque reference value if the electric traction vehicle is operating in the motoring mode (e.g., the vehicle controller 24 receives an acceleration input), and a negative torque reference value if the electric traction vehicle is operating in a regeneration mode (e.g., the vehicle controller 34 receives a deceleration or braking input). It should be understood that any of a number of different conventions may be used to indicate the magnitude and direction of the torque reference value other than using negative and positive values.

The speed reference function 42 is configured to receive a vehicle speed signal 52 representative of the speed of the electric traction vehicle, and to determine a speed reference value based on the vehicle speed signal depending on whether the electric traction vehicle is operating in the motoring mode or the regeneration mode. According to an exemplary embodiment, if the electric traction vehicle is operating in the motoring mode, the speed reference function 42 is configured to determine an "overspeed" reference value that is greater than the vehicle speed signal 52, and if the electric traction vehicle is operating in the regeneration mode, the speed reference function 42 is configured to determine an "underspeed" reference value that is less than the vehicle speed signal 52. The speed reference function 42 processes the vehicle speed signal 52 and outputs a speed reference signal 54 containing either the overspeed reference value or the underspeed reference value.

The motor drive controller 26 includes a speed regulator 44 and a torque output control function 46, and is configured to determining a torque output signal 56 using the torque reference signal 50, the speed reference signal 54, and a wheel speed feedback signal 58. The speed regulator 44 is configured to receive the speed reference signal 54 and the wheel speed feedback signal 58, and to output a second torque reference signal 60 containing a second torque reference value. The torque output control function 46 is configured to receive the torque reference signal 50 and the second torque reference signal 60, and to select one of these signals as the torque output signal 56.

According to an exemplary embodiment, the torque output function 46 selects either signal 50 or signal 60 depending on which signal contains the lower torque reference value if the electric traction vehicle is operating in the motoring mode, and selects either signal 50 or signal 60 depending on which signal contains the greater torque reference value if the electric traction vehicle is operating in the regeneration mode. In the present embodiment, the torque reference values are considered to be increasing in order from the lowest possible negative value to the highest possible positive value, such that negative torque values indicating a higher magnitude are considered lower than negative torque values indicating lower magnitudes by the torque output function. It should be understood, however, that other conventions may be used to indicate the magnitude and direction of the torque value, and the selection of either the higher or lower torque reference value by the torque output function may be adjusted accordingly to select the minimum value, the maximum value, the absolute minimum or maximum value, etc.

Speed regulator 44 determines the second torque reference value such that the speed reference value contained in the speed reference signal 54 provides a limit for the speed of the wheel coupled to the electric motor controlled by the vehicle drive controller. If the electric traction vehicle is operating the motoring mode, the overspeed reference value contained in the speed reference signal 54 provides an upper limit for the speed of the wheel coupled to the electric motor controlled by the vehicle drive controller 26. The speed regulator 44 is configured such that, as long as the wheel speed feedback signal 58 indicates that the speed of the wheel coupled to the electric motor controlled by the vehicle drive controller 26 is equal to or less than the overspeed reference value, (e.g., the wheel speed is 20 mph and the overspeed reference value is 23 mph), the speed regulator outputs the second torque reference signal 60 containing a second torque reference value that is equal to or greater than the torque reference value in the torque reference signal 50. The torque output control function 46 selects the torque reference signal 50 as the torque output signal 56 because torque reference signal 50 contains a torque reference value lower than or equal to the torque reference signal 60. If the wheel speed feedback signal 58 indicates that the speed of the wheel coupled to the electric motor controlled by the vehicle drive controller 26 has begun to exceed the overspeed reference value, (e.g., the wheel speed is 24 mph and the overspeed reference value is 23 mph indicating potential wheel slippage), the speed regulator outputs the second torque reference signal 60 containing a second torque reference value that is less than the torque reference value in the torque reference signal 50. The torque output control function 46 selects the torque reference signal 60 as the torque output signal 56 because torque reference signal 60 contains a torque reference value lower than the torque reference signal 50, and limits the speed of wheel coupled to the electric motor controlled by the vehicle drive controller to the overspeed reference value. Using this configuration, the vehicle drive controller 26 uses the torque reference value from the vehicle controller 24 until wheel slip occurs. When wheel slip occurs, the vehicle drive controller limits the speed of the slipping wheel to the overspeed reference without modifying the torque reference value from the vehicle controller 24.

If the electric traction vehicle is operating the regeneration mode, the underspeed reference value contained in the speed reference signal 54 provides a lower limit for the speed of the wheel coupled to the electric motor controlled by the vehicle drive controller 26. The speed regulator 44 is configured such that, as long as the wheel speed feedback signal 58 indicates that the speed of the wheel coupled to the electric motor controlled by the vehicle drive controller 26 is greater than or equal to the underspeed reference value, (e.g., the wheel speed is 23 mph and the underspeed reference value is 20 mph), the speed regulator outputs the second torque reference signal 60 containing a second torque reference value that is equal to or less than the torque reference value in the torque reference signal 50. The torque output control function 46 selects the torque reference signal 50 as the torque output signal 56 because torque reference signal 50 contains a torque reference value greater than or equal to the torque reference signal 60. If the wheel speed feedback signal 58 indicates that the speed of the wheel coupled to the electric motor controlled by the vehicle drive controller 26 has begun to fall below the underspeed reference value, (e.g., the wheel speed is 19 mph and the underspeed reference value is 20 mph indicating potential wheel locking), the speed regulator outputs the second torque reference signal 60 containing a second torque reference value that is greater than the torque reference value in the torque reference signal 50. The torque output control function 46 selects the torque reference signal 60 as the torque output signal 56 because torque reference signal 60 contains a torque reference value greater than the torque reference signal 50, and limits the speed of wheel coupled to the electric motor controlled by the vehicle drive controller to the underspeed reference value. Using this configuration, the vehicle drive controller 26 uses the torque reference value from the vehicle controller 24 until wheel locking occurs. When wheel locking occurs, the vehicle drive controller limits the speed of the locking wheel to the underspeed reference without modifying the torque reference value from the vehicle controller 24.

Figure 3:
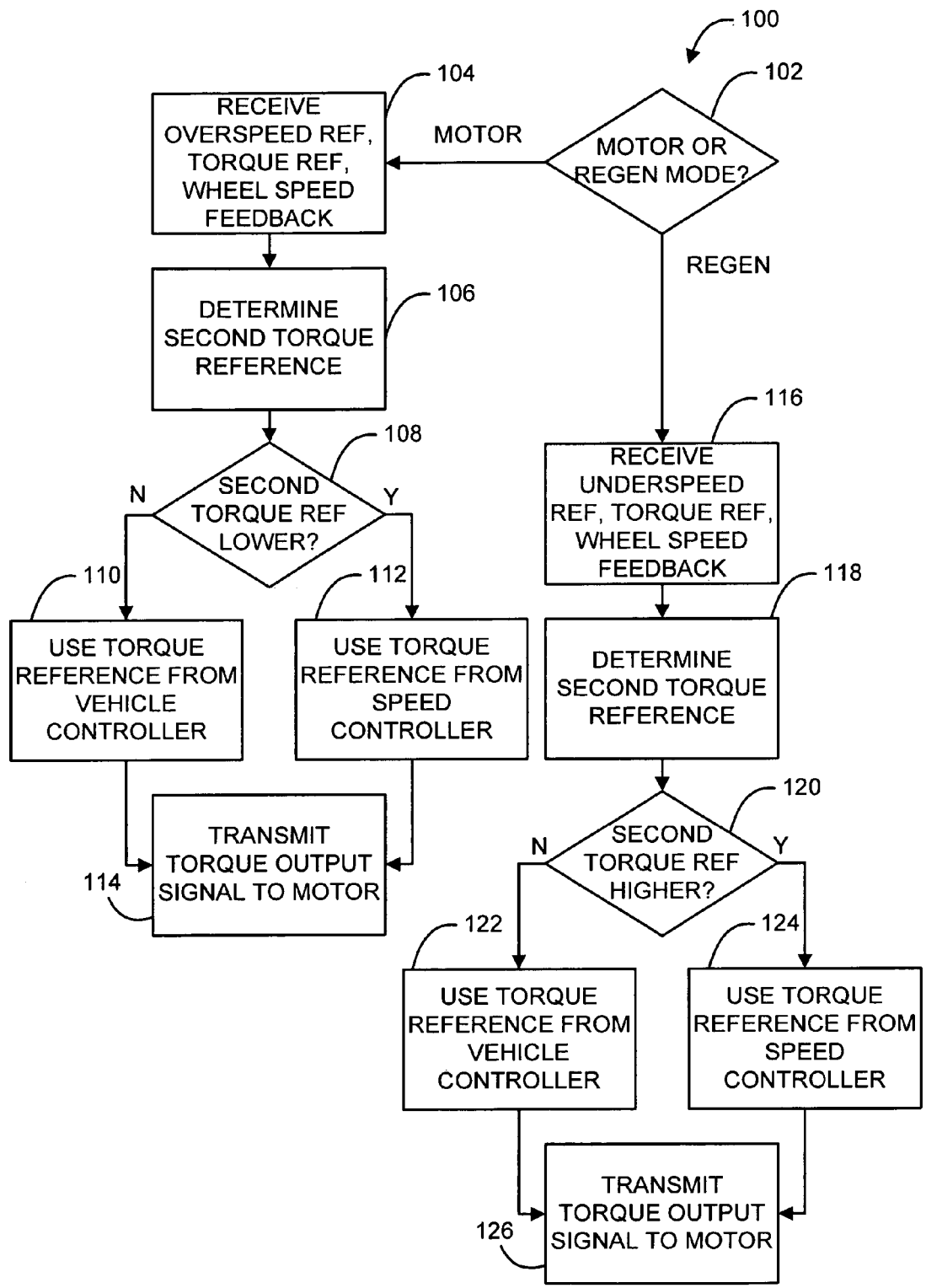
FIG. 3 is a flowchart illustrating a process for reducing wheel slip or wheel locking in an electric traction vehicle according to an exemplary embodiment.

FIG. 3 is a flowchart illustrating a method 100 for reducing wheel slip or wheel locking in an electric traction vehicle according to an exemplary embodiment. Method 100 may be implemented using, for example, the electric traction vehicle 10 shown in FIG. 1 and the vehicle controller 24 and motor drive controller 26 shown in FIG. 2. Method 100 begins with a step 102. In step 102, if the electric traction vehicle 10 is operating in the motoring mode, the method continues with a step 104, and if the electric traction vehicle 10 is operating in the regeneration mode, the method continues with a step 116. In step 104, the torque reference signal 50, and the speed reference signal 54 containing an overspeed reference value are received by the motor drive controller 26, along with the wheel speed feedback signal 58. In a step 106, the motor drive controller 26 determines the second torque reference 60 using the speed reference signal 54 and the wheel speed feedback signal 58. In a step 108, if the second torque reference signal 60 contains a torque reference value greater than or equal to the torque reference signal 50, the torque reference signal 50 from the vehicle controller 24 is used as the torque output signal 56 in a step 110. If the second torque reference signal 50 contains a torque reference signal value less than the torque reference signal 50, the second torque reference signal 60 is used as the torque output signal in a step 112 such that the speed reference value contained in speed reference signal 54 provides an upper limit on the speed of a wheel coupled to the electric motor 16 controlled by motor drive controller 26. In a step 114, the torque output signal 56 is transmitted to the electric motor 16 controlled by the motor drive controller 26.

In step 116, the torque reference signal 50, and the speed reference signal 54 containing an underspeed reference value are received by the motor drive controller 26, along with the wheel speed feedback signal 58. In a step 118, the motor drive controller 26 determines the second torque reference 60 using the speed reference signal 54 and the wheel speed feedback signal 58. In a step 120, if the second torque reference signal 60 contains a torque reference value less than or equal to the torque reference signal 50, the torque reference signal 50 from the vehicle controller 24 is used as the torque output signal 56 in a step 122. If the second torque reference signal 50 contains a torque reference signal value greater than the torque reference signal 50, the second torque reference signal 60 is used as the torque output signal in a step 124 such that the underspeed reference value contained in speed reference signal 54 provides a lower limit on the speed of a wheel coupled to the electric motor 16 controlled by motor drive controller 26. In a step 126, the torque output signal 56 is transmitted to the electric motor 16 controlled by the motor drive controller 26.

The foregoing description of embodiments has been presented for purposes of illustration and description. It is not intended to be exhaustive or to be limited to the precise forms disclosed, and modifications and variations are possible in light of the above teachings or may be acquired from practice of the invention. For example, differing control functions may be used to select the torque output signal based on additional torque reference signals, different directional or polarity conventions for the torque reference signals, different minimum, maximum, or absolute maximum and minimum value conventions for the torque reference signals, etc. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

What is claimed is:

1. A method of reducing wheel slip and wheel locking in an electric traction vehicle comprising:
   providing by a second controller a first signal value representative of a first amount of torque to a plurality of motor controllers including a first controller, each of the plurality of motor controllers controlling one of a plurality of motors, each of the plurality of motor controllers coupled to one of a plurality of wheels;
   for each of the plurality of motor controllers, including the first controller, performing the following steps:
      receiving in the first controller the first signal value representative of a first amount of torque to be applied to the wheel by the motor coupled to the wheel and to the first controller, and a second signal value representative of a reference speed of the electric traction vehicle, wherein the first and second signal values are generated by the second controller in communication with the first;
      receiving in the first controller a third signal value representative of a speed of the wheel;
      comparing the second signal and the third signal in a speed controller of the first controller to determine whether the wheel is slipping and whether the wheel is locking;
      determining in the first controller a torque output signal using the first, second, and third signal values, wherein the torque output signal is less than the first signal value if the wheel is slipping, and wherein the torque output signal is greater than the first signal value if the wheel is locking;
      transmitting the torque output signal from the first controller to the motor; and
      applying an amount of torque to the wheel based on the torque output signal.

2. The method of claim 1, further comprising determining in the first controller a fourth signal value representative of a second amount of torque to be applied to the wheel using the second and third signals, and wherein determining the torque output signal comprises selecting one of the first signal value and the fourth signal value as the torque output signal.

3. The method of claim 2, wherein the electric fraction vehicle comprises a motoring mode and a regeneration mode and is configured to operate in one of the motoring mode and the regeneration mode.

4. The method of claim 3, wherein the electric traction vehicle is configured to operate in the motoring mode, and wherein the reference speed is greater than an actual speed of the electric traction vehicle.

5. The method of claim 4, wherein determining the torque output signal comprises selecting one of the first signal value and the fourth signal value as the torque output signal such that the reference speed provides an upper limit for the speed of the wheel.

6. The method of claim 4, wherein determining the torque output signal comprises selecting the first signal value as the torque output signal if the speed of the wheel is one of less than or equal to the reference speed, and selecting the fourth signal value as the torque output signal if the speed of the wheel is greater than the reference speed.

7. The method of claim 4, wherein determining the torque output signal comprises selecting the first signal value as the torque output signal if the first signal value is one of less than or equal to the fourth signal value, and selecting the fourth signal value as the torque output signal if the if the first signal value is greater than the fourth signal value.

8. The method of claim 3, wherein the electric traction vehicle is configured to operate in the regeneration mode, and wherein the reference speed is less than an actual speed of the electric traction vehicle.

9. The method of claim 8, wherein determining the torque output signal comprises selecting one of the first signal value and the fourth signal value as the torque output signal such that the reference speed provides a lower limit for the speed of the wheel.

10. The method of claim 8, wherein determining the torque output signal comprises selecting the first signal value as the torque output signal if the speed of the wheel is one of greater than or equal to the reference speed, and selecting the fourth signal value as the torque output signal if the speed of the wheel is less than the reference speed.

11. The method of claim 8, wherein determining the torque output signal comprises selecting the first signal value as the torque output signal if the first signal value is one of greater than or equal to the fourth signal value, and selecting the fourth signal value as the torque output signal if the first signal value is less than the fourth signal value.

12. The method of claim 1, wherein the motor comprises an AC electric motor and the first controller comprises an inverter.

13. A method of reducing wheel slip and wheel locking in an electric traction vehicle comprising:
   configuring a vehicle system controller to determine a first torque value and a reference speed value;
   configuring a motor drive controller coupled to an electric motor and in communication with the vehicle system controller to determine a second torque value using the reference speed value and a speed of a wheel coupled to the electric motor, the motor drive controller being one of a plurality of motor controllers in communication with the vehicle system controller, the wheel being one of a plurality of wheels, each of the plurality of motor controllers being associated with one of a plurality of wheels;

configuring the motor drive controller to transmit a torque output signal representative of one of the first torque value and the second torque value, the torque output signal being determined such that the reference speed provides an upper limit for the speed of the wheel if the wheel is slipping and such that the reference speed provides a lower limit for the speed of the wheel if the wheel is locking; and configuring the electric motor to provide an amount of torque to the wheel based on the torque output signal.

14. The method of claim 13, wherein the electric fraction vehicle comprises a motoring mode and a regeneration mode and is configured to operate in one of the motoring mode and the regeneration mode.

15. The method of claim 14, wherein the electric traction vehicle is configured to operate in the motoring mode, and wherein the reference speed value is greater than an actual speed of the electric traction vehicle.

16. The method of claim 15, further comprising selecting the torque output signal to be representative of one of the first torque value and the second torque value such that the reference speed value provides an upper limit for the speed of the wheel.

17. The method of claim 15, further comprising selecting the torque output signal to be representative of the first torque value if the speed of the wheel is one of less than or equal to the reference speed value, and selecting the torque output value to be representative of the second torque value if the speed of the wheel is greater than the reference speed value.

18. The method of claim 15, further comprising selecting the torque output signal to be representative of the first torque value if the first torque value is one of less than or equal to the second torque value, and selecting the torque output signal to be representative of the second torque value if the first torque value is greater than the second torque value.

19. The method of claim 14, wherein the electric traction vehicle is configured to operate in the regeneration mode, and wherein the reference speed value is less than an actual speed of the electric traction vehicle.

20. The method of claim 19, further comprising selecting the torque output signal to be representative of one of the first torque value and the second torque value such that the reference speed value provides a lower limit for the speed of the wheel.

21. The method of claim 19, further comprising selecting the torque output signal to be representative of the first torque value if the speed of the wheel is one of greater than or equal to the reference speed value, and selecting the torque output value to be representative of the second torque value if the speed of the wheel is less than the reference speed value.

22. The method of claim 19, further comprising selecting the torque output signal to be representative of the first torque value if the first torque value is one of greater than or equal to the second torque value, and selecting the torque output signal to be representative of the second torque value if the first torque value is less than the second torque value.

23. The method of claim 13, wherein the motor comprises an AC electric motor and the first controller comprises an inverter.

24. An electric traction vehicle comprising:
a vehicle controller configured to determine a first torque value and a reference speed value;
a first motor drive controller coupled to a first electric motor and in communication with the vehicle system controller; and
a second motor drive controller coupled to a second electric motor and in communication with the vehicle system controller;
wherein the first motor drive controller is configured to determine a second torque value using the reference speed value and a speed of a first wheel coupled to the first electric motor, and to transmit a first torque output signal representative of one of the first torque value and the second torque value, the first torque output signal being determined such that the reference speed provides an upper limit for the speed of the first wheel if the first wheel is slipping and such that the reference speed provides a lower limit for the speed of the first wheel if the first wheel is locking;
wherein the second motor drive controller is configured to determine a third torque value using the reference speed value and a speed of a second wheel coupled to the second electric motor, and to transmit a second torque output signal representative of one of the first torque value and the third torque value, the second torque output signal being determined such that the reference speed provides an upper limit for the speed of the second wheel if the second wheel is slipping and such that the reference speed provides a lower limit for the speed of the second wheel if the second wheel is locking;
wherein the first electric motor is configured to provide a first amount of torque to the first wheel based on the first torque output signal, and wherein the second electric motor is configured to provide a second amount of torque to the second wheel based on the second torque output signal.

25. The electric traction vehicle of claim 24, wherein the electric traction vehicle is configured to operate in one of a motoring mode and a regeneration mode.

26. The electric traction vehicle of claim 25, wherein the electric traction vehicle is configured to operate in the motoring mode, and wherein the reference speed value is greater than an actual speed of the electric traction vehicle.

27. The electric traction vehicle of claim 26, wherein the first motor drive controller is further configured to select the first torque output signal to be representative of one of the first torque value and the second torque value such that the reference speed value provides an upper limit for the speed of the first wheel.

28. The electric traction vehicle of claim 26, wherein the first motor drive controller is further configured to select the first torque output signal to be representative of the first torque value if the speed of the first wheel is one of less than or equal to the reference speed value, and to select the torque output value to be representative of the second torque value if the speed of the first wheel is greater than the reference speed value.

29. The electric traction vehicle of claim 26, wherein the motor drive controller is further configured to select the torque output signal to be representative of the first torque value if the first torque value is one of less than or equal to the second torque value, and to select the torque output signal to be representative of the second torque value if the first torque value is greater than the second torque value.

30. The electric traction vehicle of claim 25, wherein the electric traction vehicle is configured to operate in the regeneration mode, and wherein the reference speed value is less than an actual speed of the electric traction vehicle.

31. The electric traction vehicle of claim 30, further comprising selecting the first torque output signal to be representative of one of the first torque value and the second torque value such that the reference speed value provides a lower limit for the speed of the first wheel.

32. The electric traction vehicle of claim 30, wherein the first motor drive controller is further configured to select the first torque output signal to be representative of the first torque value if the speed of the first wheel is one of greater than or equal to the reference speed value, and to select the first torque output value to be representative of the second torque value if the speed of the first wheel is less than the reference speed value.

33. The electric traction vehicle of claim 30, wherein the motor drive controller is further configured to select the torque output signal to be representative of the first torque value if the first torque value is one of greater than or equal to the second torque value, and to select the torque output signal to be representative of the second torque value if the first torque value is less than the second torque value.

34. The method of claim 1, wherein the reference speed of the electric traction vehicle is generated by the second controller based on a speed signal received at the second controller, wherein the reference speed is greater than the speed signal if the vehicle is in a motoring mode and wherein the reference speed is less than the speed signal if the vehicle is in a regeneration mode.

* * * * *